United States Patent
Pflueger et al.

(10) Patent No.: US 7,705,510 B2
(45) Date of Patent: Apr. 27, 2010

(54) STRIP-TYPE SEGMENT AND LAMINATED STATOR CORE FOR AN ELECTRICAL MACHINE

(75) Inventors: Klaus Pflueger, Eberdingen (DE); Martin Henne, Moeglingen (DE); Thomas Berger, Ditzingen (DE); Erberhard Rau, Korntal-Muenchingen (DE); Wolfgang Harrer, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/491,092

(22) PCT Filed: Jul. 30, 2003

(86) PCT No.: PCT/DE03/02558

§ 371 (c)(1),
(2), (4) Date: Mar. 29, 2004

(87) PCT Pub. No.: WO2004/021547

PCT Pub. Date: Mar. 11, 2004

(65) Prior Publication Data

US 2004/0239191 A1  Dec. 2, 2004

(30) Foreign Application Priority Data

Jul. 30, 2002 (DE) .................. 102 34 610

(51) Int. Cl.
*H02K 1/18* (2006.01)
*H02K 1/16* (2006.01)
*H02K 15/02* (2006.01)

(52) U.S. Cl. .......... 310/216.009; 310/216.008
(58) Field of Classification Search .......... 310/216, 310/218, 254, 258, 259, 216.008–216.009; 29/596, 597, 598

See application file for complete search history.

(56) References Cited

U.S. PATENT DOCUMENTS

| 4,102,040 | A | * | 7/1978 | Rich ........................... 29/598 |
| 5,096,348 | A | | 3/1992 | Winkler et al. |
| 5,382,859 | A | * | 1/1995 | Huang et al. ................. 310/216 |
| 5,986,377 | A | * | 11/1999 | Yamada et al. .............. 310/216 |
| 6,741,005 | B2 | * | 5/2004 | Vohlgemuth ................ 310/216 |
| 6,819,024 | B1 | * | 11/2004 | Fujita et al. ................. 310/216 |
| 2001/0005104 | A1 | * | 6/2001 | Nakahara et al. ............ 310/216 |
| 2004/0239191 | A1 | * | 12/2004 | Pflueger et al. .............. 310/10 |

FOREIGN PATENT DOCUMENTS

DE    26 29 532        1/1977
DE    196 33 399 A1    2/1998

(Continued)

OTHER PUBLICATIONS

Machine Translation of Sakashita et al. (JP 07-067273).*

(Continued)

*Primary Examiner*—Karl I Tamai
(74) *Attorney, Agent, or Firm*—Michael J. Striker

(57) ABSTRACT

A striplike lamination (10) for a stator of an electrical machine is proposed, in which the striplike lamination has an end contour (19) on each strip end (18). The end contours (19) are embodied such that a difference in length at the lamination (10) resulting from bending can be compensated for.

13 Claims, 2 Drawing Sheets

| | FOREIGN PATENT DOCUMENTS | | |
|---|---|---|---|
| EP | 1 109 285 A2 | | 6/2001 |
| EP | 1 109 286 | | 6/2001 |
| JP | 59-129547 | * | 7/1984 |
| JP | 06070513 | * | 3/1994 |
| JP | 07-067273 | * | 3/1995 |
| JP | 9-308143 | | 11/1997 |
| JP | 10155248 | | 6/1998 |
| JP | 2002-359939 | * | 12/2002 |

OTHER PUBLICATIONS

Manual translation of jp 59-129547, Iizuka et al., Jul. 1984.*
Abstract of JP 3066536 A, Buinkuraa et al., Mar. 22, 1991, "Machine Tool".*
Patent Abstracts of Japan JP 2000023397, Jan. 21, 2000.
Patent Abstracts of Japan JP10052006, Feb. 20, 1998.

* cited by examiner

STRIP-TYPE SEGMENT AND LAMINATED STATOR CORE FOR AN ELECTRICAL MACHINE

BACKGROUND OF THE INVENTION

The invention relates to a striplike lamination for a stator of an electrical machine and to a stator lamination packet made of such striplike laminations. From German Patent Disclosure DE-OS 26 295 32, a stator for an electrical machine is already known which is made from an iron packet that is initially present in flat form. To produce it, striplike laminations provided with slots are disposed such that they form a flat lamination packet. All the slots of the individual laminations are oriented in the same direction, resulting in an overall comblike arrangement of this packet. This flat packet is hereinafter called a flat packet. In the aforementioned patent disclosure, this flat packet is bent into a round shape in a further step in such a way that a stator lamination packet is obtained which can be used like conventional annular stator lamination packets. This reference already describes the fact that after the flat packet has been bent into a round shape, the two ends facing one another of the laminations are separated by a slight spacing. To join these two ends together, it is provided that they be joined together by welding, using a coating metal. This embodiment has two disadvantages. First, a coating metal must additionally be applied, which on the one hand involves cost and on the other requires major expenditure of energy, on the one hand to melt it and on the other to join this coating metal to the two ends. A further disadvantage is that this coating metal creates a relatively large nonlaminated cross section in the axial direction of the stator. Because there are increased eddy currents in the cross section of the stator, this increases the corresponding eddy current losses. Moreover, the application welding introduces a relatively large amount of energy into the stator. Furthermore, the gap mentioned in the prior art between the two ends leads to poorer efficiency at that point.

SUMMARY OF THE INVENTION

The striplike lamination according to the invention for a stator of an electrical machine, having the characteristics of the main claim, has the advantage that the altered end contour compensates for a difference in length of the lamination caused by bending, so that between the two ends, after the bending into a round shape, there is no longer any spacing between the end faces, or ends. The two ends can then be joined without application welding. This has the advantage that no further material has to be melted. The energy input is less, and an especially economical welding method can be employed. Laser welding is especially suitable, as an example.

By the provisions recited in the dependent claims, advantageous refinements of the striplike lamination of the main claim are possible. If the lamination has a yoke region with a neutral bending line, and the yoke region on the side remote from the teeth, on the far side of the neutral bending line, is longer than the neutral line, then the requirement for a joining operation at the two ends without an interstice can be accomplished on the outside of the stator. The outer circumference of the stator is round and closed and can be joined by means of the laser welding process already mentioned.

It is furthermore provided that in the yoke region between the neutral bending line and the side of the yoke toward the teeth, the yoke region is shorter than the bending line. By this provision, overall, an interstice between the outside of the yoke and the inside of the yoke, or the two ends, is avoided.

Overall, there are various possibilities for compensation at the ends of the lamination; a further possibility is to embody the lamination as concave on one end and convex on its other end, so that the two shapes first supplement one another in compensatory fashion, in the sense of being without gaps, and on the other lead to a positive engagement, which reinforces the bond between the two ends.

A stator lamination packet for an electrical machine is also provided, in which the stator lamination packet is produced from laminations of one of the foregoing claims. A stator lamination packet of this kind has especially good roundness and is thus especially simple to insert into bearing plates made round on a lathe.

BRIEF DESCRIPTION OF THE DRAWINGS

In the drawings, exemplary embodiments of a striplike lamination of the invention, a stator lamination packet, and a corresponding electrical machine are shown. Shown are.

DETAILED DESCRIPTION OF THE PREFERRED EMBODIMENTS

Figure 1:
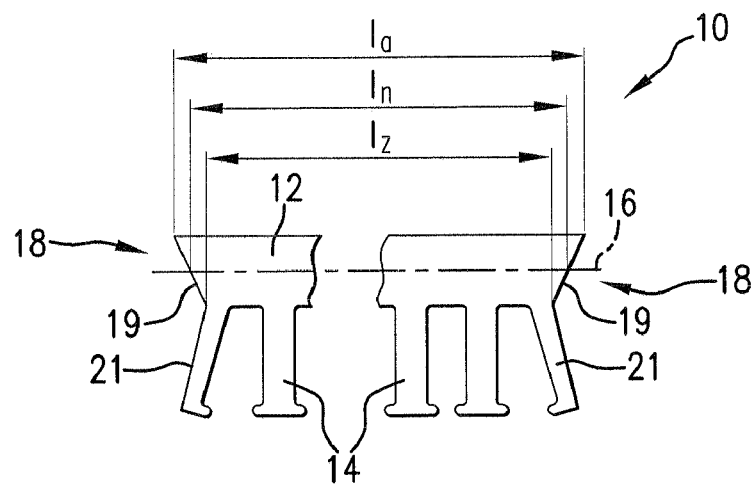
FIG. 1, a striplike lamination for a stator, in a side view.

In FIG. 1, a striplike lamination 10 of the invention is shown. The lamination 10 comprises a yoke region 12 and teeth 14 that are integrally joined to this yoke region 12. The teeth 14 and the yoke region 12 are in the same plane. The lamination 10, as in the prior art described at the outset, is intended to be bent in its plane. The yoke region 12 takes the form of a circular ring, as is known from stators made from annular laminations. In this intended bending in the plane of the yoke region 12 and the teeth 14, the teeth 14 are oriented radially inward. Inside the yoke region 12, the bending produces what is usually called a "neutral fiber" bending line, which results approximately in the middle of the yoke region 12 and here is called the neutral bending line 16. This neutral bending line corresponds to the zone or line, in a material that is to be bent or that has been bent, in which neither tensile nor compressive stress prevails.

The lamination 10 has two ends 18, each with an end contour 19, which extends over the yoke region 12 and one end tooth 21 each. Both end teeth 21 are embodied such that together they form one tooth, which in its action is equivalent to one complete tooth 14. One part of the end contour 19 defines the two end teeth 21. This part of the end contour 19 is not oriented perpendicular to the neutral bending line 16; instead, this part of the end contour 19 forms an angle that is greater than 90° with the bending line 16. Thus in contrast to the teeth 14, the two end teeth 21 are slightly spread apart from the yoke region 12. The slots between each end tooth 21 and a respective adjacent tooth 14 are larger than the slots between each two immediately adjacent teeth 14.

In the stretched-out original state of the striplike lamination, at least three different dimensions can be seen in the yoke region 12. The dimension $l_a$ can be found on the side of the yoke region 12 remote from the teeth 14, or in other words on the later outer circumference of the stator. In the region of the neutral bending line 16, that is, approximately in the middle of the yoke region 12, length $l_n$ of the neutral bending line 16 can be ascertained. On the later inside circumference of the yoke region 12 as well, that is, precisely at the point where the teeth 14 merge with the yoke region 12, a measurement can be made. This length is called $l_z$.

For the lengths $l_a$, $l_n$ and $l_z$, on the condition that as a result of the end contour 19, a difference in length at the lamination 10 resulting from bending can be compensated for, the following conditions apply:

The length $l_a$ must be greater than the line $l_n$ of the neutral bending line 16. Thus the lamination 10 has a yoke region 12 with a neutral bending line 16, which yoke region, on the side of the yoke region 12 remote from the teeth 14, on the far side of the neutral bending line 16, is longer than the neutral bending line 16.

Another desired condition is that $l_z$ is less than $l_n$. This formulation means the same as the condition that the lamination 10 has a yoke region 12 with a neutral bending line 16, and the yoke region on the side toward the teeth 14, on the far side of the neutral bending line 16, is shorter than the neutral bending line 16. The end teeth 21, with one side, likewise form one part of the end contour 19. In the view in FIG. 1, it is provided that the two end contours 19 together with the end teeth 21 form one concave end contour 19. In the example of FIG. 1, it is shown that the transition of the end contour between the yoke region 12 and the end tooth 21 is not smoothed but instead is pointed.

Figure 2:
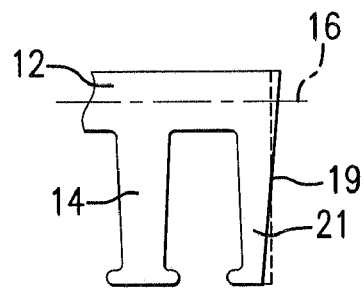
FIG. 2, a fragmentary view of the end region of a striplike lamination in a second exemplary embodiment.

FIG. 2 shows a variant of an end contour 19. In a distinction from the exemplary embodiment of FIG. 1, the end contour 19 in the exemplary embodiment of FIG. 2 has a course without a kink, so that although the formulated relationships with regard to $l_a$, $l_n$ and $l_z$ still have validity, nevertheless the end contour 19 extends essentially in a straight line, and thus the end tooth 21 is somewhat narrower than in FIG. 1. The dashed line in FIG. 2 shows the contour 19 in the prior art.

Figure 3:
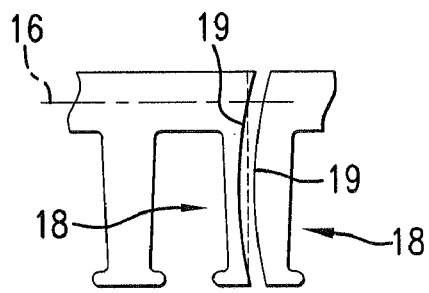
FIG. 3 again shows the end region of a striplike lamination in a third exemplary embodiment.

In FIG. 3, a further exemplary embodiment for a lamination 10 is shown. Here, the two end contours 19 of the lamination 10 are located facing one another. This makes their cooperation clear. Here, the lamination 10 has a concave end contour 19 on one end 18 and a convex end contour 19 on its other end. Once again, both end contours 19 are shaped such that a difference in length at the lamination caused by bending can be compensated for. Furthermore, embodying the two ends with a concave and convex form respectively means that a certain positive engagement is made possible.

Figure 4:
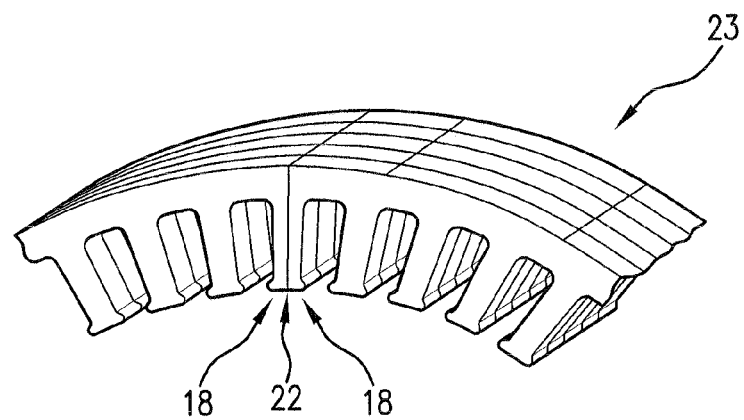
FIG. 4 is a fragmentary view of a stator made of striplike laminations of the invention.

In FIG. 4, a stator lamination packet 23 is shown. In particular, the joining point 22 at which the ends 18 of the laminations 10 are joined together is shown. The stator lamination packet 23 comprises a certain number of initially striplike laminations 10, which as in the prior art are bent into a round stator iron in such a way that the teeth 14 point radially inward. The laminations 10 of the stator lamination packet 23 are produced in accordance with one of the exemplary embodiments described above for the striplike laminations 10.

Figure 5:
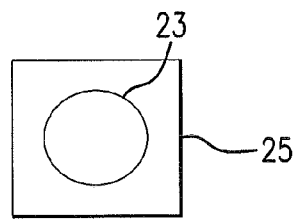
FIG. 5 symbolically shows an electrical machine with a stator produced from striplike laminations of the invention.

In FIG. 5, an electrical machine 25 with a stator lamination packet 23 of FIG. 4 is shown. This illustration is symbolic. The stator lamination packet 23 has a winding, not shown, and with it forms a stator, which is intended for interaction with a rotor, not shown. It is provided that the winding be inserted, and in the stretched-out, flat state of the lamination packet, into the slots between the teeth 14 and end teeth 21. Moreover, a stator lamination packet produced in this way is also suitable for windings that are inserted into the slots by the known drawing-in technique.

Figure 6:
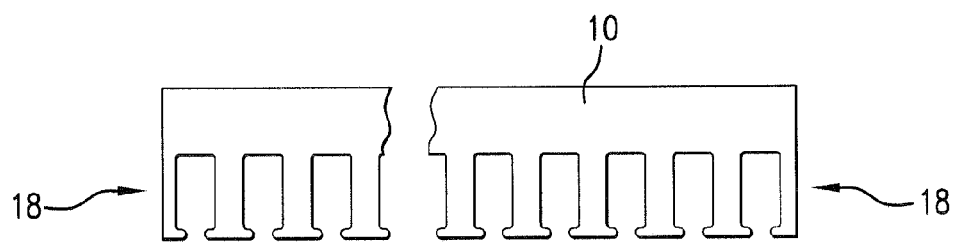
FIG. 6 shows a striplike lamination of the prior art.

FIG. 6 shows a conventional striplike lamination 10 known from the prior art, in which the ends 18 are not shaped in such a way that they compensate for a difference in length at the lamination 10 caused by bending.

Figure 7:
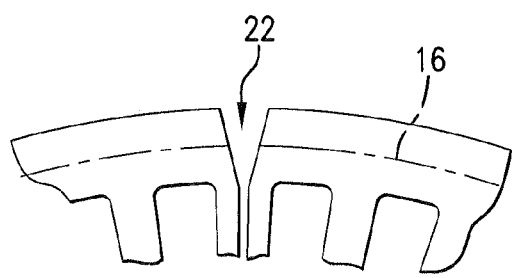
FIG. 7 is a fragmentary view of the joining point before welding in the prior art.

In FIG. 7, the effect of the bending of such conventional striplike laminations 10 into a round shape is shown. It can be seen clearly that at the joining point 22, a gap is created on the circumference of the stator iron 23.

The invention claimed is:

1. A striplike lamination for a stator of an electrical machine, comprising: two strip ends, each end having an end tooth and one end contour (19) on each strip end (18), wherein the lamination has a straight yoke region (12), wherein, by means of a shape of the end contour (19), a difference in length at the lamination (10) caused by bending of the straight yoke region can be compensated for, wherein the end contour (19) on each strip end (18) extends over the straight yoke region (12) and the end tooth (21), wherein the end teeth (21) of the lamination are formed so that the end teeth together comprise one tooth when in a bended, curved state, and wherein the end contour on each strip (19) forms a concave end contour (19) which extends over a respective end tooth (21) and the straight yoke region (12), wherein the strip like lamination has two identical end contours.

2. The striplike lamination of claim 1, wherein the straight yoke region (12) has a neutral bending line (16), which on the side facing away from teeth (14), on a side spaced from the neutral bending line (16), is longer than the neutral bending line (16).

3. The striplike lamination of claim 1, wherein the straight yoke region (12) has a neutral bending line (16), which on the side facing toward teeth (14), on a side spaced from the neutral bending line (16), is shorter than the neutral bending line (16).

4. The striplike lamination of claim 1, wherein the lamination (10) is embodied as concave on one end and convex on another end.

5. A stator lamination packet for an electrical machine, wherein it is produced from laminations (10) of claim 1.

6. An electrical machine having a stator lamination packet of claim 5.

7. The striplike lamination of claim 1, wherein grooves between an end tooth (21) and an adjacent tooth (14) are greater than grooves between two directly adjacent teeth (14).

8. A striplike lamination for a stator of an electrical machine as defined in claim 1, wherein each end contour of each strip has a concavity which extends from a radially outermost tip of an end contour to a radially innermost tip of the end contour.

9. A striplike lamination for a stator of an electrical machine as defined in claim 1, wherein a round bending of the lamination and an opposite abutment of the concave end contour are configured so that a gap is eliminated.

10. A striplike lamination for a stator of an electrical machine as defined in claim 1, wherein a round bending of the lamination and an opposite abutment of the concave end contour are configured so that a gap is eliminated.

11. A striplike lamination for a stator of an electrical machine, comprising: two strip ends, each end having an end tooth and one end contour (19) on each strip end (18), wherein the lamination has a straight yoke region (12), wherein, by means of a shape of the end contour (19), a difference in length at the lamination (10) caused by bending of the straight yoke region can be compensated for, wherein the end contour (19) on each strip end (18) extends over the straight yoke region (12) and the end tooth (21), wherein the end teeth (21) of the lamination are formed so that the end teeth together comprise one tooth when in a bended, curved state, and wherein the end contour on each strip (19) forms a concave end contour (19) which extends over a respective end tooth (21) and the straight yoke region (12), wherein each end contour of each strip has a concavity which extends from a radially outermost tip of an end contour to a radially innermost tip of the end contour.

12. A striplike lamination for a stator of an electrical machine as defined in claim 11, wherein a round bending of the lamination and an opposite abutment of the concave end contour are configured so that a gap is eliminated.

13. A striplike lamination for a stator of an electrical machine, comprising: two strip ends, each end having an end tooth and one end contour (19) on each strip end (18), wherein the lamination has a straight yoke region (12), wherein, by means of a shape of the end contour (19), a difference in length at the lamination (10) caused by bending of the straight yoke region can be compensated for, wherein the end contour (19) on each strip end (18) extends over the straight yoke region (12) and the end tooth (21), wherein the end teeth (21) of the lamination are formed so that the end teeth together comprise one tooth when in a bended, curved state, and wherein the end contour on each strip (19) forms a concave end contour (19) which extends over a respective end tooth (21) and the straight yoke region (12), the end contour (19) with a part which defines the end tooth (21) forms a bending line (16) with an angle which is greater than 90°, wherein each end contour of each strip has a concavity which extends from a radially outermost tip of an end contour to a radially innermost tip of the end contour.

\* \* \* \* \*